(12) United States Patent
Igarashi

(10) Patent No.: US 8,297,306 B2
(45) Date of Patent: Oct. 30, 2012

(54) FLUID REGULATOR

(75) Inventor: Hiroki Igarashi, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 913 days.

(21) Appl. No.: 11/660,049

(22) PCT Filed: Jul. 15, 2005

(86) PCT No.: PCT/JP2005/013131
§ 371 (c)(1),
(2), (4) Date: Feb. 12, 2007

(87) PCT Pub. No.: WO2006/022096

PCT Pub. Date: Mar. 2, 2006

(65) Prior Publication Data
US 2007/0251583 A1    Nov. 1, 2007

(30) Foreign Application Priority Data

Aug. 26, 2004 (JP) ................. 2004-247162

(51) Int. Cl.
*F16K 31/365* (2006.01)
(52) U.S. Cl. .............. 137/501; 137/505.18; 137/505.41; 137/505.42; 251/63.5; 251/335.3
(58) Field of Classification Search ........... 137/505.18, 137/495, 494, 497, 500, 501, 505.38, 505.39, 137/505.41, 505.42; 251/63.5, 335.3
See application file for complete search history.

(56) References Cited

U.S. PATENT DOCUMENTS 2,627,703 A * 2/1953 Spencer ............... 137/484.2
3,654,948 A * 4/1972 Nelson ................ 137/118.07
(Continued)

FOREIGN PATENT DOCUMENTS
JP    11-85287    3/1999
(Continued)

OTHER PUBLICATIONS

European Search Report dated Nov. 14, 2011, Application No. 05766295.9.

*Primary Examiner* — William McCalister
(74) *Attorney, Agent, or Firm* — Young & Thompson

(57) ABSTRACT

A fluid regulator that has excellent flow-rate-control response for not only pressure fluctuations at the primary side but also pressure fluctuations at the secondary side and that realizes highly accurate flow-rate control is provided. A fluid regulator 10 includes a first diaphragm chamber 16 in which a working force obtained from a gas, such as air, is received by a first diaphragm 14 to generate a force for adjusting a valve opening, a second diaphragm chamber 17 in which pressure fluctuations of a fluid introduced from a secondary side are received by a second diaphragm 15 to generate a force for adjusting the valve opening, a shaft 12 that receives the adjusting forces generated in the first diaphragm chamber 16 and the second diaphragm chamber 17 and slides in the shaft direction, a valve 13 that operates together with the shaft 12 to adjust the valve opening, a partition wall 11*a* that isolates the first diaphragm chamber 16 from the second diaphragm chamber 17 so as not to interfere with each other, and a bellows 22 that blocks the circulation of the fluid between the first diaphragm chamber 16 and the second diaphragm chamber 17.

2 Claims, 5 Drawing Sheets

U.S. PATENT DOCUMENTS

| | | | | |
|---|---|---|---|---|
| 5,595,209 A | * | 1/1997 | Atkinson et al. | 137/116.5 |
| 5,746,245 A | * | 5/1998 | Foster | 137/505.35 |
| 5,983,926 A | | 11/1999 | Mastuzawa | |
| 6,026,849 A | * | 2/2000 | Thordarson | 137/501 |
| 2004/0004199 A1 | * | 1/2004 | Igarashi | 251/63.5 |

FOREIGN PATENT DOCUMENTS

| | | |
|---|---|---|
| JP | 2001-187145 | 7/2001 |
| JP | 2003-167635 | 6/2003 |
| JP | 2004-70746 | 3/2004 |

* cited by examiner

FLUID REGULATOR

TECHNICAL FIELD

The present invention relates to a fluid regulator that can perform constant-flow-rate control and pressure-reduction control of a fluid in response to not only pressure fluctuations at the primary side but also pressure fluctuations at the secondary side.

BACKGROUND ART

Fluid regulators (flow-rate control valves) for controlling the flow rate of various types of fluid, such as chemicals, have been widely used. According to the general structure of such a fluid regulator, a diaphragm receives pressure fluctuations at the primary side (upstream side), and a valve that operates together with the diaphragm adjusts a valve opening in a fluid flow path to control the flow rate.

Recently, for example, in chemical feeding in a wafer cleaning line of a semiconductor manufacturing apparatus, there have been demands for highly accurate flow-rate control that can respond not only to pressure fluctuations at the primary side but also to pressure fluctuations at the secondary side (downstream side). Examples of the pressure fluctuations at the secondary side include the effect of back pressure generated by, for example, a confluence of a plurality of flow paths or pressure fluctuations at the primary side, and load fluctuations caused by, for example, a change in the fluid viscosity due to temperature changes.

In view of this background, the following flow-rate control valve has been proposed as a flow-rate control valve that can also respond to the above-described pressure fluctuations at the secondary side. In this flow-rate control valve, a fluid at the secondary side is introduced into a differential pressure chamber in which diaphragms having different effective areas are provided at the upper side and the lower side to control the flow rate. In this case, the upper and lower diaphragms receive the same pressure fluctuation in the differential pressure chamber. Accordingly, since a working force for operating a valve is generated in accordance with the difference in the area of the diaphragms, the flow rate is controlled depending on the change in a valve opening (see for example Patent Document 1).

Patent Document 1: Japanese Unexamined Patent Application, Publication No. Hei-11-85287

DISCLOSURE OF INVENTION

However, in the related art described in Patent Document 1, the flow-rate control valve is configured so as to respond to pressure fluctuations at the secondary side by utilizing the working force of the valve opening generated by the difference in the area of the diaphragms that receive the same pressure fluctuation. Therefore, in order to perform flow-rate control in which pressure fluctuations at the secondary side are reliably reflected, it is necessary to ensure a sufficient difference in the area. That is, when the upper and lower diaphragms receive the same pressure fluctuation, forces in opposite vertical directions which cancel out each other (forces in the opposite directions with respect to the direction of opening and closing of the valve) are generated. Accordingly, when the area difference or the pressure fluctuation is small, a sufficient working force required for changing the valve opening cannot be obtained, which may result in a problem in terms of the flow-rate-control response.

In particular, a fluid regulator for controlling the flow rate of a chemical feeding system in a wafer cleaning line of a semiconductor manufacturing apparatus is often used for a flow path having a small pipe diameter (nominal size: about ¼ to ⅔ inches). Accordingly, since the size of the regulator is also small, it is extremely difficult to ensure a sufficient difference in the area.

The present invention has been made in view of the above situation, and it is an object of the present invention to provide a relatively small fluid regulator that has excellent flow-rate-control response for not only pressure fluctuations at the primary side but also pressure fluctuations at the secondary side and that realizes highly accurate flow-rate control.

In order to solve the above problem, the present invention provides the following solutions.

According to a fluid regulator of the present invention, a fluid regulator for controlling the flow rate of a fluid passing therethrough to be constant by adjusting a valve opening includes a first diaphragm chamber in which a working force obtained from a gas is received by a diaphragm to generate a force for adjusting the valve opening, a second diaphragm chamber in which pressure fluctuations of the fluid introduced from a secondary side are received by a diaphragm to generate a force for adjusting the valve opening, a shaft that receives the adjusting forces generated in the first diaphragm chamber and the second diaphragm chamber and that slides in the shaft direction, a valve that operates together with the shaft to adjust the valve opening, a partition wall that isolates the first diaphragm chamber from the second diaphragm chamber so as not to interfere with each other, and sealing means for blocking the circulation of the fluid between the first diaphragm chamber and the second diaphragm chamber.

According to the fluid regulator, the fluid regulator includes a first diaphragm chamber in which a working force obtained from a gas is received by a diaphragm to generate a force for adjusting the valve opening, a second diaphragm chamber in which pressure fluctuations of the fluid introduced from a secondary side are received by a diaphragm to generate a force for adjusting the valve opening, a shaft that receives the adjusting forces generated in the first diaphragm chamber and the second diaphragm chamber and that slides in the shaft direction, a valve that operates together with the shaft to adjust the valve opening, a partition wall that isolates the first diaphragm chamber from the second diaphragm chamber so as not to interfere with each other, and sealing means for blocking the circulation of the fluid between the first diaphragm chamber and the second diaphragm chamber. Accordingly, pressure fluctuations at the secondary side are blocked by the partition wall and the sealing means and have no effect at the first diaphragm chamber side. Therefore, almost all of the pressure fluctuations at the secondary side introduced into the second diaphragm chamber act on the shaft as a force for adjusting the valve opening due to the pressure fluctuations at the secondary side. Thus, a force in the opposite direction that cancels out the adjusting force can be eliminated or minimized.

In the fluid regulator of the present invention the diaphragms preferably include a reinforcing component. Accordingly, breakage and deformation of the diaphragms can be prevented.

According to the above-described fluid regulator of the present invention, a phenomenon in which pressure fluctuations at the secondary side act as a force in the opposite direction that adversely affects the force for adjusting the valve opening can be prevented or minimized. Therefore, the fluid regulator of the present invention affords significant advantages in that, even in a relatively small fluid regulator, excellent flow-rate-control response for not only pressure fluctuations at the primary side but also pressure fluctuations at the secondary side can be achieved to realize highly accurate flow-rate control.

BEST MODE FOR CARRYING OUT THE INVENTION

A fluid regulator according to an embodiment of the present invention will now be described with reference to the drawings.

Figure 1:
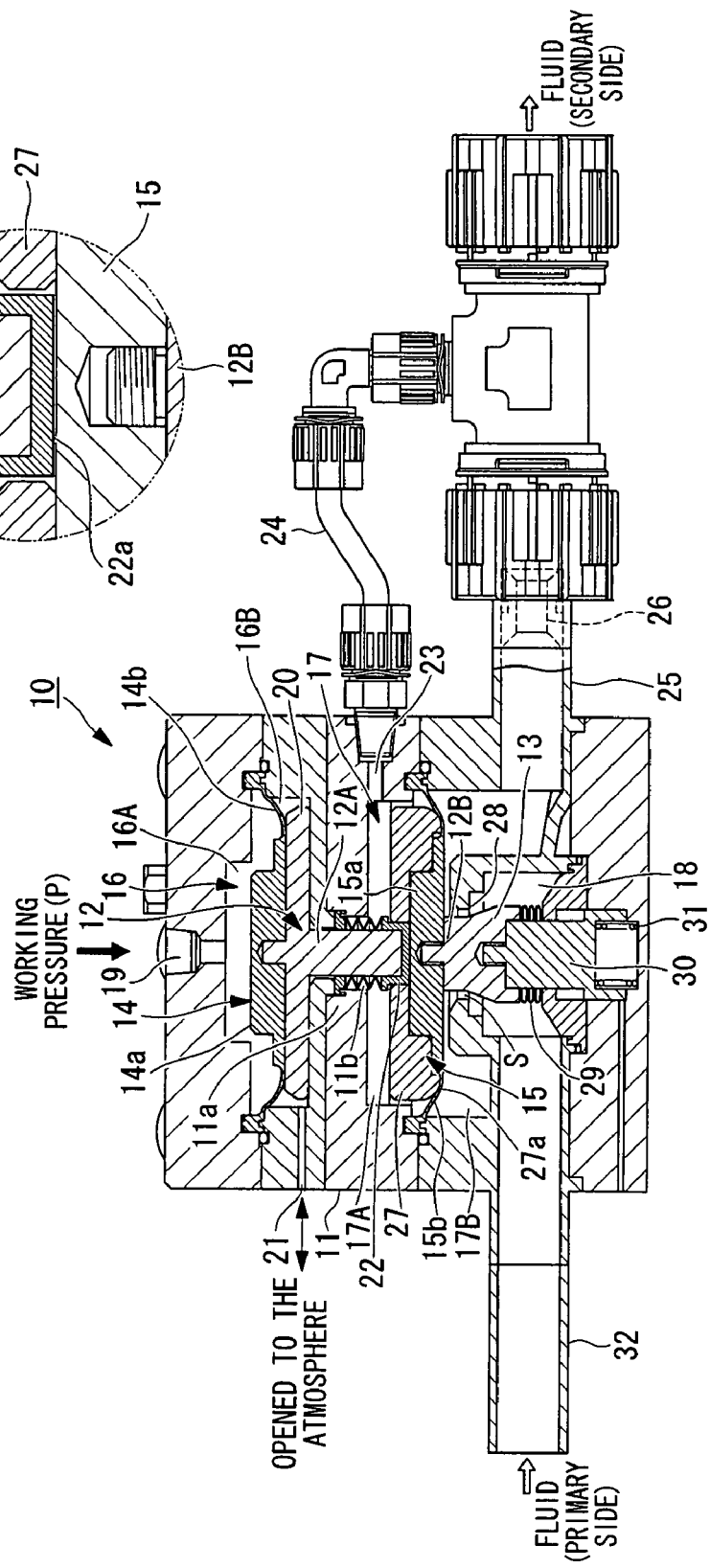
FIG. 1 is a cross-sectional view showing a fluid regulator according to an embodiment of the present invention, showing a state during flow-rate control.
Figure 2:
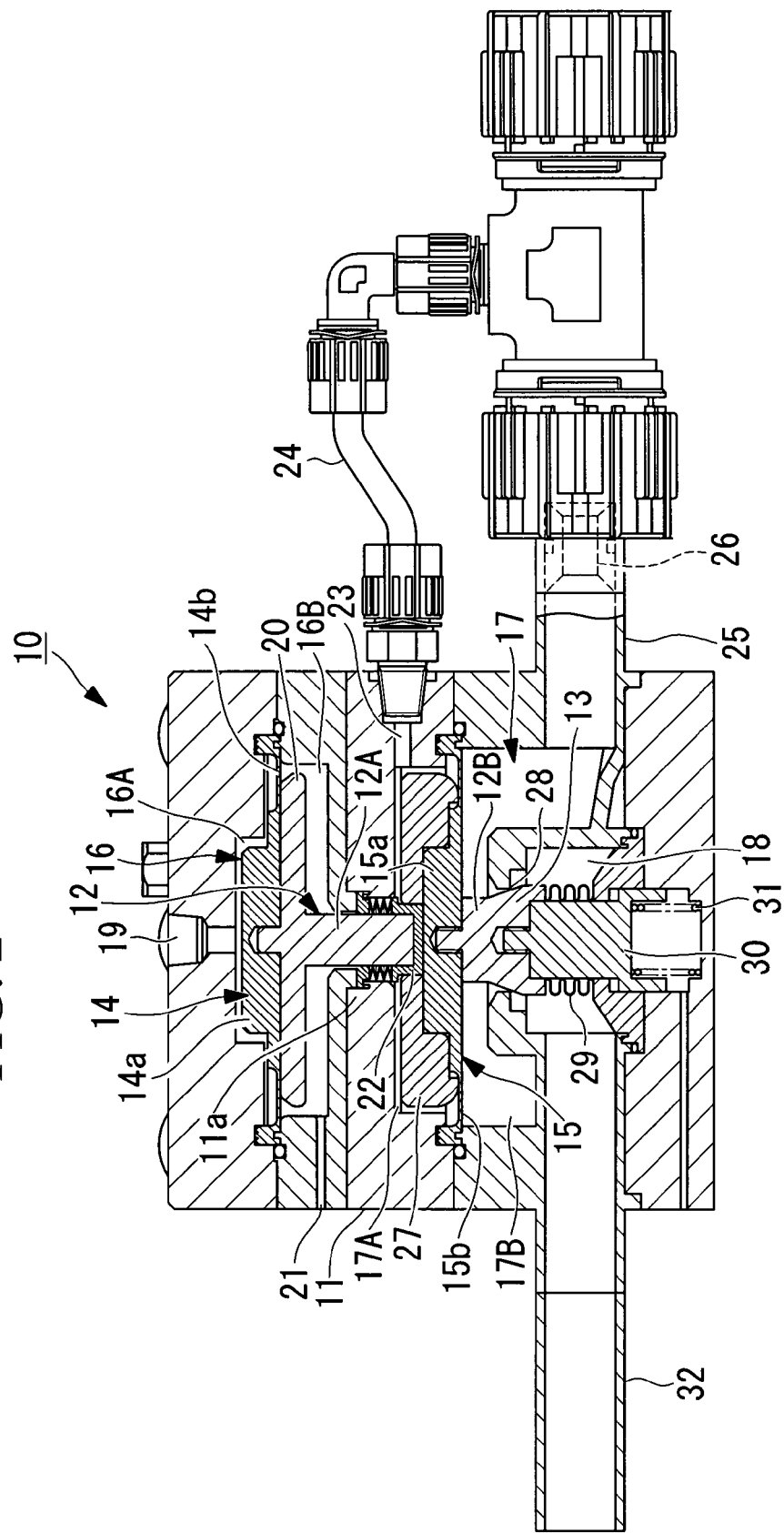
FIG. 2 is a cross-sectional view showing a state in which the fluid regulator shown in FIG. 1 is fully closed.

FIGS. 1 and 2 are cross-sectional views showing an example of the structure of a fluid regulator for controlling the flow rate of a fluid passing therethrough to be constant by adjusting a valve opening. FIG. 1 shows a state in which the flow rate is controlled, and FIG. 2 shows a state in which the fluid regulator is fully closed.

In a housing 11 of a fluid regulator (hereinafter referred to as "regulator") 10, a valve 13 that performs an opening/closing operation in the vertical direction together with a shaft 12 to adjust the cross-sectional area of a fluid flow path is provided. The shaft 12 is divided into two shafts, that is, upper and lower shafts. The central part of a first diaphragm 14 is fixed and supported on an upper shaft 12A disposed at the upper side, and the central part of a second diaphragm 15 is fixed and supported on a lower shaft 12B disposed at the lower side.

The housing 11 includes three spaces; that is, the space in the housing 11 is divided into, from the upper part along the shaft 12, a first diaphragm chamber 16 accommodating the first diaphragm 14, a second diaphragm chamber 17 accommodating the second diaphragm 15, and a flow-rate control chamber 18 accommodating the valve 13 in that order.

The circumference of the first diaphragm 14 is secured and supported in the housing 11 thereby dividing the inside of the first diaphragm chamber 16 into two spaces, that is, upper and lower spaces. A working-pressure connection opening 19 for introducing a working gas, such as air, is provided in an upper space 16A of the first diaphragm 14. A working-gas supply pipe (not shown) is connected to the working-pressure connecting opening 19, and, for example, nitrogen, which is an inert gas, is used. In the following description, air is used as the working gas supplied from the working-gas supply pipe.

A central part 14a of the first diaphragm 14 has a large thickness, and the first diaphragm 14 is secured and supported on a disc-shaped diaphragm bed 20 that is integrated with the upper shaft 12A. This diaphragm bed 20 is a rigid component functioning as a reinforcing component of the first diaphragm 14. A ring-shaped thin part 14b reinforced by the diaphragm bed 20 so as to allow smooth vertical motion is provided at the periphery of the first diaphragm 14. In order to receive the working pressure as effectively as possible and to reinforce the thin part 14b, the size of the diaphragm bed 20 is preferably maximized, so long as the vertical motion of the first diaphragm 14 is not impeded. The diaphragm bed 20 must have a diameter larger than at least the diameter of the central part 14a, which is the thickest part of the first diaphragm 14.

On the other hand, a lower space 16B of the first diaphragm 14 is opened to the atmosphere through a communicating opening 21 penetrating through the housing 11. Accordingly, in the first diaphragm chamber 16, the upper surface of the first diaphragm 14 receives a downward working pressure P supplied from the working-pressure connecting opening 19, and the lower surface side of the first diaphragm 14 is opened to the atmosphere. Accordingly, a working force (force for adjusting the valve opening) calculated by the product of the working pressure P and the pressure-receiving area acts on the upper shaft 12A.

The upper shaft 12A passes through a partition wall 11a provided between the first diaphragm chamber 16 and the second diaphragm chamber 17 and is disposed on the upper end face of the second diaphragm 15. A bellows 22, functioning as sealing means, which is suitable for the vertical motion and which produces only a very small amount of contaminant during the vertical motion, is fitted in the upper shaft 12A passing through the partition wall 11a. The partition wall 11a is provided in order that pressure fluctuations received from the secondary side, which will be described below, do not affect the first diaphragm chamber 16 and so that the working pressure applied from the working-pressure connecting opening 19 effectively acts. A through-hole 11b disposed inside the partition wall 11a is preferably as small as possible. However, an excessively small through-hole 11b is not preferable in view of the strength of the upper shaft 12A.

By inserting the bellows 22, an effect caused by circulation of a fluid (a liquid introduced from the secondary side described below and pressure fluctuations thereof) between the first diaphragm chamber 16 and the second diaphragm chamber 17 can be prevented. In this case, since the first diaphragm chamber 16 can be separated from the fluid, chemical resistance of the first diaphragm chamber 16 need not be considered. Accordingly, the first diaphragm chamber 16 may be composed of an inexpensive, general-purpose resin.

In the embodiment shown in the figure, the bellows 22 is used as the sealing means. Alternatively, other sealing components, such as an O-ring, may be used.

The circumference of the second diaphragm 15 is secured and supported in the housing 11, thereby dividing the inside of the second diaphragm chamber 17 into two spaces, that is, upper and lower spaces. A secondary-side inlet 23 for introducing the fluid of the secondary side, the fluid passing through the flow-rate control chamber 18, is provided in an upper space 17A of the second diaphragm 15. A branch pipe 24 is connected to the secondary-side inlet 23. The branch pipe 24 is branched from the downstream side of an orifice 26 provided in a secondary-side outlet pipe 25 of the regulator 10. In the orifice 26, an orifice diameter corresponding to a desired set flow rate is appropriately selected for use.

A central part 15a of the second diaphragm 15 has a large thickness, and a disc-shaped diaphragm bed 27 is fixed and integrated with the second diaphragm 15 so as to overlap with the top surface of the central part. This diaphragm bed 27 is a rigid component functioning as a reinforcing component of the second diaphragm 15. A ring-shaped thin part 15b reinforced by the diaphragm bed 27 so as to allow smooth vertical motion is provided at the periphery of the second diaphragm 15. In order not to impede the vertical motion of the second diaphragm 15, a rounded portion 27a is provided at the tip of the diaphragm bed 27 so that a clearance is formed between the diaphragm bed 27 and the second diaphragm 15.

The upper end of the lower shaft 12B is connected to the central part 15a of the second diaphragm 15. The valve 13 is provided at the lower end of the lower shaft 12B so as to be integrated with the lower shaft 12B.

Accordingly, in the second diaphragm chamber 17, a working force (force for adjusting a valve opening), generated by the action of pressure fluctuations at the secondary side on the second diaphragm 15, acts on the lower shaft 12B.

On the other hand, a lower space 17B of the second diaphragm 15 communicates with the flow-rate control chamber 18 through an open area in a fluid flow path (clearance S) formed between the valve 13 and a valve seat 28.

In the flow-rate control chamber 18, a lower valve stem 30 is connected to the lower end of the valve 13, with a lower bellows 29 therebetween. A lower spring 31 is provided between the housing 11 and the lower end of the lower valve stem 30. Consequently, this regulator 10 is configured so that the valve 13 constantly receives an upward urging force from the lower spring 31. Additionally, reference numeral 32 in the figure represents a fluid introduction pipe at the primary side, communicating with the flow-rate control chamber 18.

Next, the operation of the regulator 10 having the above-described structure will now be described together with the flow-rate control operation.

Figure 3:
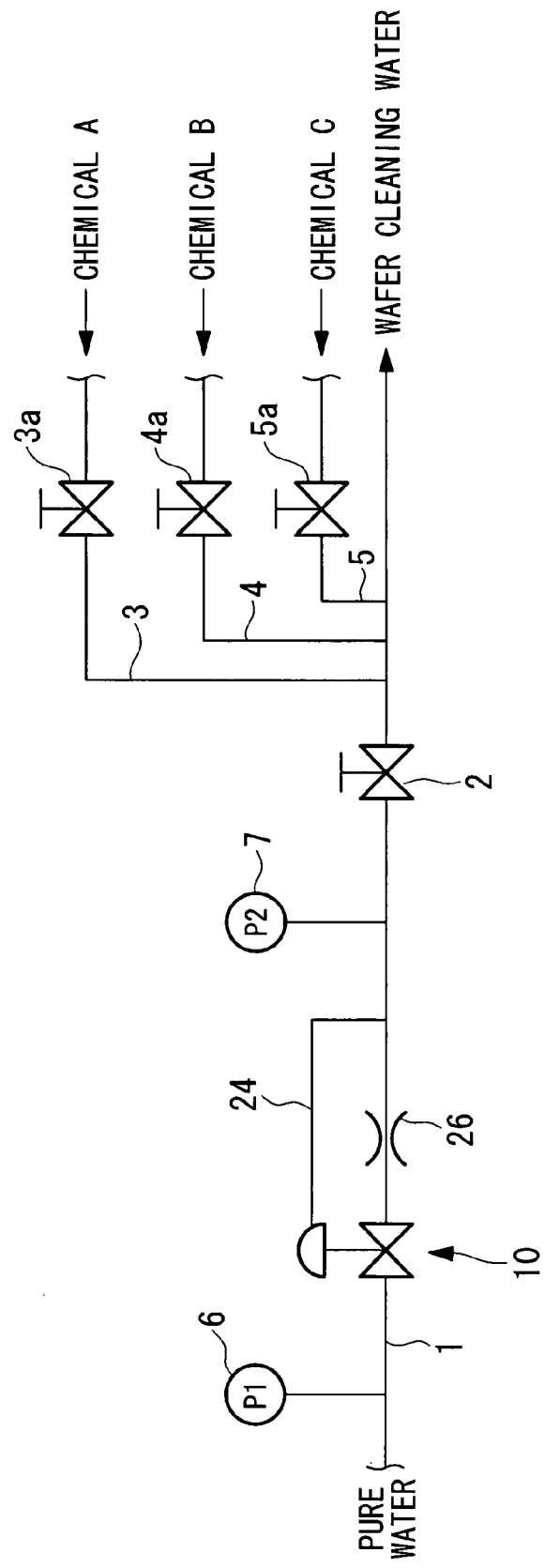
FIG. 3 is a system diagram showing an example of a wafer cleaning line of a semiconductor manufacturing apparatus, which is an example application of the fluid regulator of the present invention.

A system diagram shown in FIG. 3 shows an example of a wafer cleaning line of a semiconductor manufacturing apparatus including the regulator 10. In the cleaning line shown in the figure, the regulator 10 is connected to a main pipe 1 through which pure water flows, and the orifice 26 is provided at the downstream side of the regulator 10. At the downstream side of the orifice 26, the branch pipe 24 is branched from the main pipe 1 and is connected to the second diaphragm chamber 17 of the regulator 10.

The main pipe 1 includes an open/close valve 2 at the downstream side of the branched part of the branch pipe 24. Three types of chemical pipes 3, 4, and 5 for supplying different chemicals A, B, and C, respectively, are connected to the downstream side of the open/close valve 2. Open/close valves 3a, 4a, and 5a are connected to the corresponding chemical pipes. By selectively opening the open/close valves, a predetermined amount of desired chemical can be fed into the pure water flowing through the main pipe 1 while the flow rate of the pure water is controlled. That is, a predetermined chemical is fed into the pure water flowing through the main pipe 1 at a constant flow rate to prepare desired wafer cleaning water.

Additionally, reference numeral 6 in the figure represents a pressure gauge for measuring the pressure at the primary side of the regulator, and reference numeral 7 represents a pressure gauge for measuring the pressure at the secondary side of the regulator.

In the above-described regulator 10, first, a fluid is supplied, and in order to obtain a desired pressure and flow rate, the first diaphragm 14 is pressed downward with a certain constant air pressure (working pressure P). A working force generated by this air pressure is transmitted to the shaft 12 and further presses the second diaphragm 15 downward, via the shaft 12, to open the valve 13. Accordingly, a desired set flow rate and set pressure can be obtained at the secondary side of the regulator 10.

In this state, on the top surface of the second diaphragm 15, the working pressure produced by the air pressure acts as a force pressing the second diaphragm 15 downward via the first diaphragm 14 and the shaft 12. On the bottom surface of the second diaphragm 15, the sum of the urging force of the lower spring 31 lifting the valve 13 upward (in the fully closed direction) and the fluid pressure at the primary side acts as a force pressing the second diaphragm 15 upward. The fluid is supplied to the secondary side while being balanced in this state.

Since the lower spring 31 is provided under the valve 13, when no working pressure P acts, the valve 13 is disposed at a fully closed position.

When the working pressure P at the primary side is decreased in the above-described state, the force that is supplied from the working-pressure connecting opening 19 and that acts on the top surface of the second diaphragm 15 via the first diaphragm 14 and the shaft 12 in a direction in which the second diaphragm 15 is pressed downward becomes larger than the force that is the sum of the force of the lower spring 31 lifting the valve 13 upward and the fluid pressure at the primary side and that acts on the lower surface of the second diaphragm 15 in a direction in which the second diaphragm 15 is pressed upward. Consequently, the shape of the second diaphragm 15 is changed in a direction in which the valve 13 is pressed downward, and the second diaphragm 15 is automatically guided so that the fluid flow path (clearance S) formed between the valve 13 and the valve seat 28 is expanded for adjustment.

In the above state, even when the working pressure P at the primary side is decreased, the valve 13 is pressed downward to widen the fluid flow path (clearance S), thereby supplying a larger amount of fluid to the secondary side. As a result, the pressure at the secondary side of the regulator 10 can be maintained constant.

When a state opposite to the above state occurs, that is, when the working pressure P at the primary side is increased, the working force that is supplied from the working-pressure connecting opening 19 and that acts on the top surface of the second diaphragm 15 via the first diaphragm 14 and the shaft 12 in a direction in which the second diaphragm 15 is pressed downward becomes smaller than the working force that is the sum of the urging force of the lower spring 31 lifting the valve 13 upward and the fluid pressure at the primary side and that acts on the lower surface of the second diaphragm 15 in a direction in which the second diaphragm 15 is pressed upward. Consequently, the shape of the second diaphragm 15 is changed in a direction in which the valve 13 is pressed upward, and the second diaphragm 15 can be automatically guided so that the fluid flow path (clearance S) formed between the valve 13 and the valve seat 28 is narrowed.

Accordingly, even when the working pressure P at the primary side is increased, the valve 13 is pressed upward to narrow the fluid flow path (clearance S), thereby preventing an excessive pressure from being supplied to the secondary side. As a result, the pressure at the secondary side can be maintained constant.

Next, the case where the pressure at the secondary side fluctuates will now be described. Here, suppose that the open/close valves 3a, 4a, and 5a disposed at the secondary side are opened, and the pressure at the secondary side is increased by feeding a fluid. In this case, the fluctuating pressure at the secondary side is fed back from the secondary-side inlet 23 to the upper surface of the second diaphragm 15 so that the valve opening, i.e., the fluid flow path (clearance S) formed between the valve 13 and the valve seat 28 is widened. Accordingly, even when the pressure at the secondary side is increased, the fluid can be supplied with a higher pressure by increasing the valve opening. As a result, the same flow rate can be obtained at the secondary side.

However, the fluctuating pressure fed back from the secondary-side inlet 23 similarly acts on the first diaphragm 14, and consequently, the first diaphragm 14 moves in a direction which decreases the valve opening. However, the partition wall 11a is provided, and the partition wall 11a is configured so that the size of the through-hole 11b is as small as possible. Thus, the effect on the first diaphragm 14 is minimized. Accordingly, a force that increases the valve opening acts. That is, the fed back fluctuating pressure at the secondary side acts only on the upper surface of the second diaphragm 15. As a result, the same constant flow rate can be obtained at the secondary side.

When the open/close valves 3a, 4a, and 5a disposed at the secondary side are closed to decrease the pressure at the secondary side, an operation opposite to the above-described operation occurs, and a force acts in a direction which closes the valve 13. As a result, the same constant flow rate can be obtained at the secondary side.

In the above-described embodiment, the shaft 12 passes through the partition wall 11a, which is provided so that pressure fluctuations at the secondary side do not affect the first diaphragm 14, and is divided into two shafts, that is, upper and lower shafts. In this case, a clearance is formed between a lower end face 22a (see FIG. 1(b)) of the bellows 22 fitted in the upper shaft 12A and the second diaphragm 15, and the top face of the second diaphragm 15 facing the lower end face 22a of the bellows 22 serves as a pressure-receiving surface. The same pressure is applied to this area in both upward and downward directions. This causes a decrease in the force for adjusting the valve opening of the second diaphragm 15 in response to pressure fluctuations at the secondary side. However, since the cross-sectional area of the shaft 12 is considerably smaller than the pressure-receiving area of the diaphragm, pressure fluctuations at the secondary side can be reflected to obtain a sufficient working force, and therefore, there is no problem in view of the response.

Alternatively, the shaft 12 may be composed of a single component so as to prevent the above-described decrease in the force for adjusting the valve opening. However, in such a case, a method for providing a seal with respect to the partition wall 11a should be considered. As described above, an O-ring may also be used. However, the use of an O-ring is disadvantageous in that a frictional force is generated during vertical motions, resulting in a degradation of the response, and that the O-ring becomes worn with each vertical motion, thereby producing contaminants. In particular, in a process requiring high purity, such as a semiconductor manufacturing line, the production of contaminants causes a serious problem.

When air pressure is used for regulating the valve opening in the regulator 10, pressure fluctuations at the secondary side applied to the lower end face 22a of the bellows 22 may act in a direction such that the adjusting force at the primary side is cancelled out. In order to ensure a sufficient working force in consideration of this effect, it is necessary to increase the pressure-receiving area of the first diaphragm 14 or the pressure of the air-pressure supply source. However, in the regulator 10 having a small diameter, it is difficult to increase the size of the diaphragm. In addition, increasing the pressure of the air-pressure supply source to solve this problem results in other problems, namely, the reduced pressure resistance performance of the housing and diaphragm and the difficulty of providing such a supply source.

Accordingly, as in the regulator 10 having the above-described structure, it is important that, for example, the effective area of the second diaphragm 15 that generates a working force in response to pressure fluctuations at the secondary side be increased, the circulation of the fluid between the first diaphragm chamber 16 at the primary side and the second diaphragm chamber 17 at the secondary side be blocked, and the shaft 12 be composed of a single component to eliminate the above effect. Even when the shaft 12 is divided, the above effect should be minimized.

In the above embodiment, the diaphragm bed 20, which is a rigid component, and the upper shaft 12A are connected so as to be integrated with each other and form an umbrella shape (i.e., substantially form a T-shape in cross section), the through-hole 11b having the minimum size is provided inside the partition wall 11a, and the bellows 22, which is suitable for vertical motion, is used. Therefore, the downward working force generated by the working pressure P can be reliably transmitted to the valve 13 without significant loss, thereby allowing the operation of the valve 13.

Figure 4:
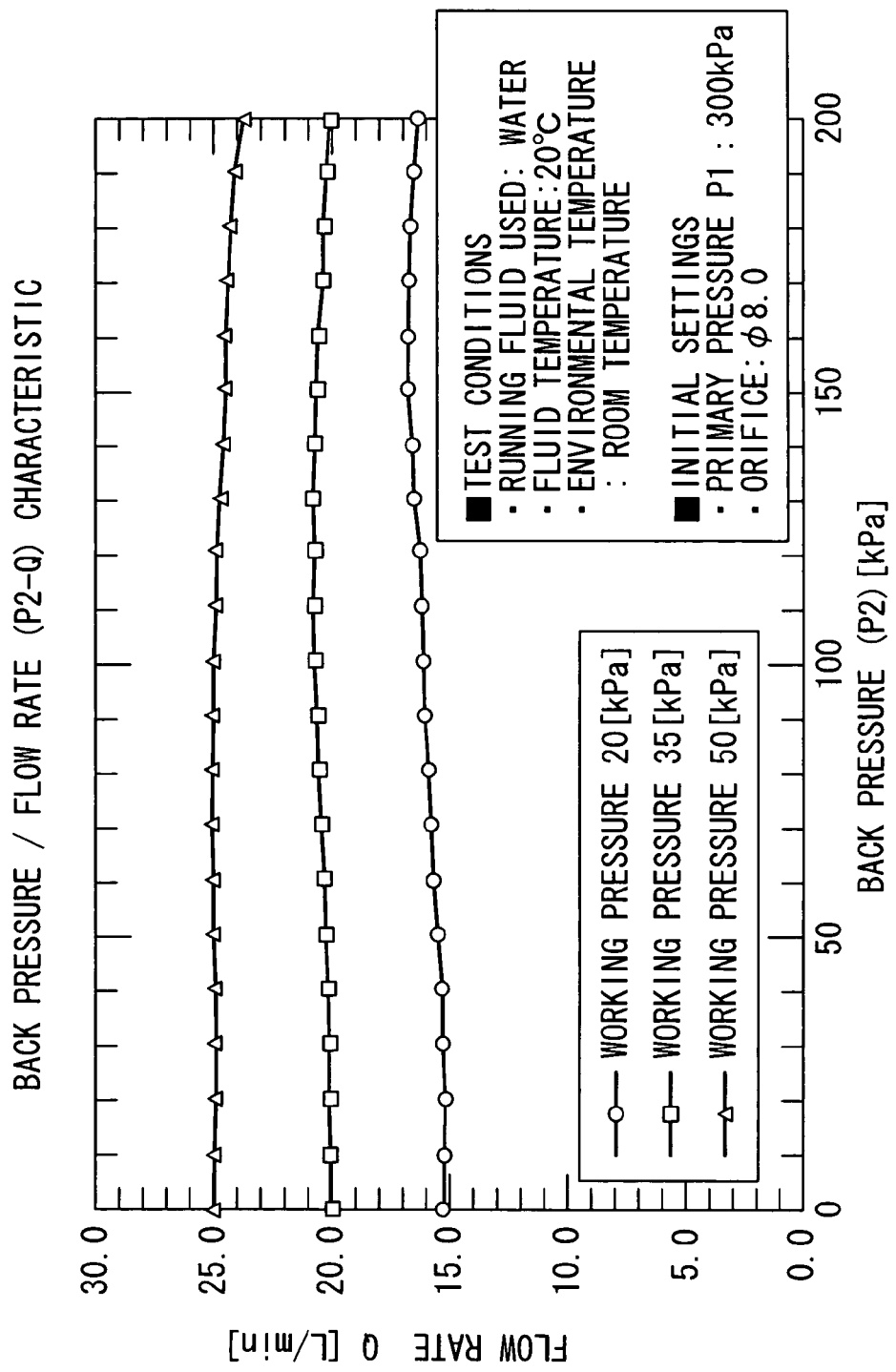
FIG. 4 is a graph showing experimental results verifying the performance of the fluid regulator of the present invention.

FIG. 4 shows experimental results verifying the performance of the regulator 10 having the above structure. In this experiment, the relationship between the back pressure (P2) and the flow rate (Q) in three types of working pressure P (20 kPa, 35 kPa, and 50 kPa) was measured under the following conditions: the fluid (liquid) used was water, the fluid temperature was 20° C., and the environmental temperature was room temperature. Regarding the initial settings, the primary pressure (P1) was 300 kPa, and the diameter of the orifice 26 was 8 mm.

Referring to the experimental results shown in FIG. 4, at all three working pressures P, even when the back pressure (P2) was increased, the flow rate (Q) was maintained substantially constant. That is, the result showed that, by using the regulator 10 having the above structure, the valve opening was appropriately adjusted in accordance with pressure fluctuations at the secondary side, and a constant-flow-rate control having an excellent response was achieved so as to maintain a desired flow rate (Q). Furthermore, in such a constant-flow-rate control, the flow rate was correlated with the pressure. Therefore, the results also showed that the valve opening was appropriately adjusted in accordance with pressure fluctuations at the secondary side, and thus, pressure-reduction control could also be performed.

Figure 5:
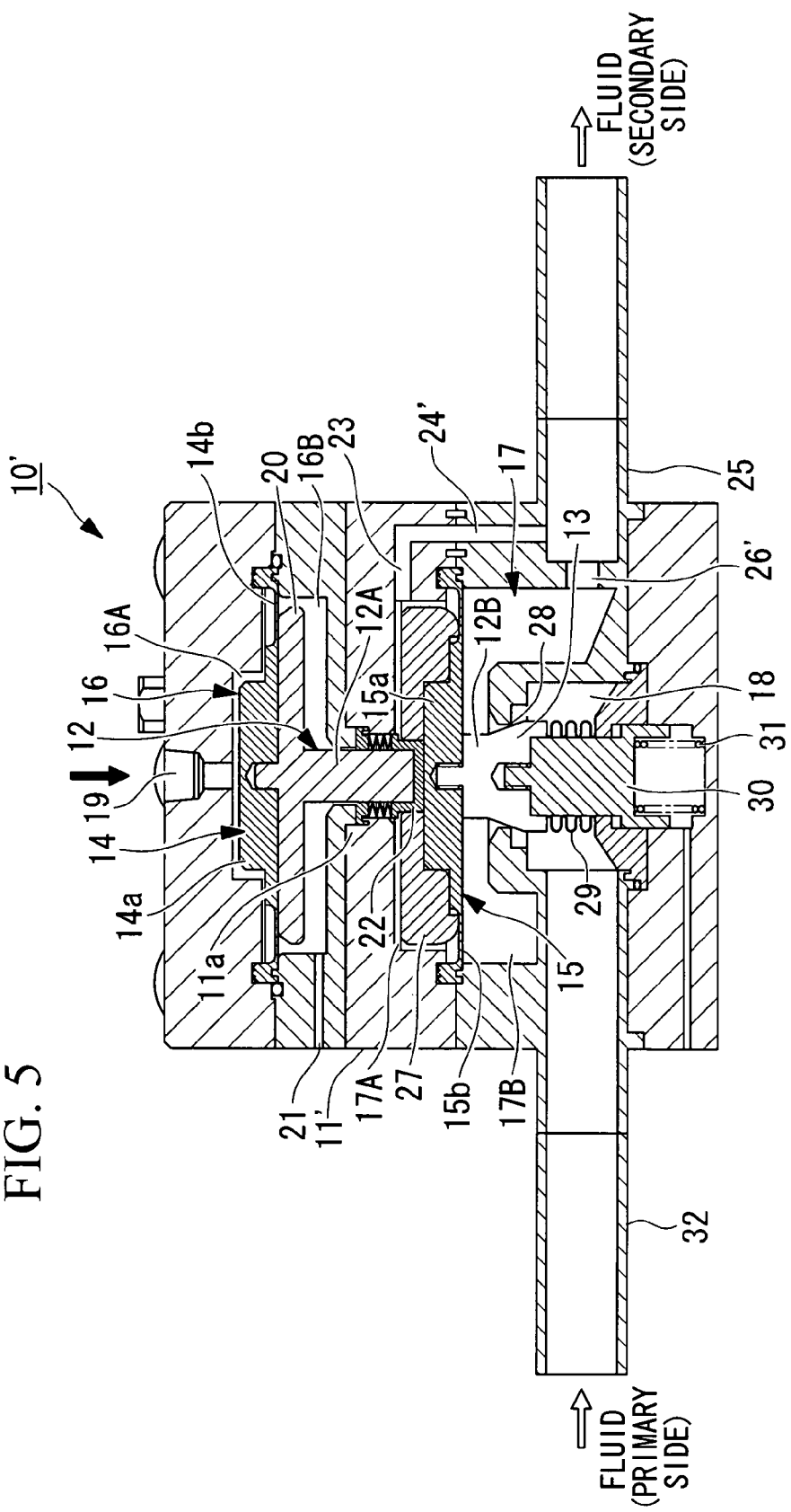
FIG. 5 is a cross-sectional view showing a modification of the fluid regulator of the present invention, showing a state in which the fluid regulator is fully closed.

Next, a modification of the above regulator 10 will now be described with reference to FIG. 5. The same constituent elements as those of the regulator 10 of the above-described embodiment are assigned the same reference numerals, and the detailed description of those elements is omitted.

This modification shows a structural example in which the orifice 26 provided in the secondary-side outlet pipe 25 and the branch pipe 24, which are disposed outside the housing 11, are provided inside the housing 11. A regulator 10' shown in the figure shows a structural example in which an orifice 26' and branch pipe 24' are provided inside a housing 11' disposed downstream of the flow-rate control chamber 18.

This integrated structure facilitates installation in a line and handling.

As described above, according to the fluid regulators 10 and 10' of the present invention, a phenomenon in which pressure fluctuations at the secondary side act as a force in the opposite direction that adversely affects the force for adjusting the valve opening can be prevented or minimized. Therefore, even in a relatively small fluid regulator, excellent flow-rate-control response can be provided for not only pressure fluctuations at the primary side but also pressure fluctuations at the secondary side, to achieve highly accurate flow-rate control.

The present invention is not limited to the above embodiments, and modifications may be optionally made without departing from the essence of the present invention.

The invention claimed is:

1. A fluid regulator for controlling the flow rate of a fluid passing therethrough to be constant by adjusting a valve opening, comprising:
   a first diaphragm chamber in which a working force obtained from a gas is received by a first diaphragm to generate a force for adjusting the valve opening;
   a second diaphragm chamber in which a bottom first surface of a second diaphragm is subject to a fluid pressure from an upstream side of the regulator and having passed the valve opening, and a top second surface of the second diaphragm, opposite to the first surface, receives pressure fluctuations of the fluid introduced from a downstream side of an orifice located at the downstream side of the regulator to generate a force for adjusting the valve opening;
   a shaft that receives the adjusting forces generated in the first diaphragm chamber and the second diaphragm chamber and that slides in a shaft direction;
   a valve that operates together with the shaft to adjust the valve opening, the valve having a lower valve stem;
   a lower spring provided against the lower valve stem, the valve constantly receiving an upward urging force from the lower spring and, during a low flow state, the valve constantly receiving an upward urging force resulting from fluid pressure at the bottom, first side of the second diaphragm;
   a partition wall that isolates the first diaphragm chamber from the second diaphragm chamber so as to prevent the pressure of the fluid in the second diaphragm chamber from acting directly on the first diaphragm; and
   sealing means for blocking the circulation of the fluid between the first diaphragm chamber and the second diaphragm chamber.

2. The fluid regulator according to claim 1, wherein at least one of the first diaphragm and the second diaphragm comprises a reinforcing component.